United States Patent [19]
Darr, Jr. et al.

[11] Patent Number: 5,583,863
[45] Date of Patent: Dec. 10, 1996

[54] FULL SERVICE NETWORK USING ASYNCHRONOUS TRANSFER MODE MULTIPLEXING

[75] Inventors: John W. Darr, Jr., Great Falls, Va.; Bahman Amin-Salehi, Washington, D.C.; Lisa M. Conoscenti, Laurel; Amos Lucas, Baltimore, both of Md.

[73] Assignee: Bell Atlantic Network Services, Inc., Arlington, Va.

[21] Appl. No.: 380,744

[22] Filed: Jan. 31, 1995

[51] Int. Cl.$^6$ ................................. H04L 12/56
[52] U.S. Cl. ........................................... 370/397
[58] Field of Search ................. 370/17, 60, 60.1, 370/62, 79, 94.1, 94.2; 348/6–8, 10, 12, 16, 17, 426, 487, 552; 359/125; 455/3.1, 4.1, 4.2, 5.1, 6.3

[56] References Cited

U.S. PATENT DOCUMENTS

| | | |
|---|---|---|
| 4,475,123 | 10/1984 | Dumbauld et al. . |
| 4,484,218 | 11/1984 | Boland et al. . |
| 4,506,387 | 3/1985 | Walter . |
| 4,527,194 | 7/1985 | Sirazi . |
| 4,530,008 | 7/1985 | McVoy . |
| 4,686,564 | 8/1987 | Masuko et al. . |
| 4,706,121 | 11/1987 | Young . |
| 4,709,418 | 11/1987 | Fox et al. . |
| 4,829,372 | 5/1989 | McCalley et al. . |
| 4,833,673 | 5/1989 | Chao et al. . |
| 4,894,714 | 1/1990 | Christis . |
| 4,897,867 | 1/1990 | Foster et al. . |
| 4,905,231 | 2/1990 | Leung et al. . |
| 4,949,187 | 8/1990 | Cohen . |
| 4,963,995 | 10/1990 | Lang . |
| 4,994,909 | 2/1991 | Graves et al. . |
| 5,010,545 | 4/1991 | Jacob . |
| 5,027,400 | 6/1991 | Baji et al. . |
| 5,057,932 | 10/1991 | Lang . |
| 5,101,404 | 3/1992 | Kunimoto et al. . |
| 5,130,792 | 7/1992 | Tindell et al. . |
| 5,132,992 | 7/1992 | Yurt et al. . |
| 5,133,079 | 7/1992 | Ballantyne et al. . |
| 5,136,411 | 8/1992 | Paik et al. . |
| 5,164,938 | 11/1992 | Jurkevich et al. . |
| 5,181,106 | 1/1993 | Sutherland . |
| 5,191,456 | 3/1993 | Sutherland et al. . |
| 5,206,858 | 4/1993 | Nakano et al. . |
| 5,220,420 | 6/1993 | Hoarty et al. . |
| 5,228,028 | 7/1993 | Cucchi et al. . |
| 5,231,494 | 7/1993 | Wachob . |
| 5,247,347 | 9/1993 | Litteral et al. . |
| 5,253,275 | 10/1993 | Yurt et al. . |
| 5,270,811 | 12/1993 | Ishibashi et al. . |
| 5,274,635 | 12/1993 | Rahman et al. . |
| 5,285,446 | 2/1994 | Yonehara . |
| 5,301,184 | 4/1994 | Uriu et al. . |
| 5,319,360 | 6/1994 | Schrodi et al. . |
| 5,323,389 | 6/1994 | Bitz et al. . |
| 5,341,376 | 8/1994 | Yamashita . |
| 5,384,771 | 1/1995 | Isidoro et al. . |
| 5,384,774 | 1/1995 | Martin et al. . |
| 5,467,349 | 11/1995 | Huey et al. ............ 370/60.1 |

*Primary Examiner*—Melvin Marcelo
*Attorney, Agent, or Firm*—Lowe, Price, LeBlanc & Becker

[57] ABSTRACT

An arrangement for transporting digital broadband data output in Asynchronous Transfer Mode (ATM) cell streams from a plurality of video information service providers (VIPs) to a plurality of subscribers. A digital broadband network is adapted to receive a plurality of ATM streams from VIPs via optical fibers having a predetermined capacity. A plurality of receivers corresponding to the optical fibers output ATM cells from the optical fibers having active ATM cell streams to an ATM edge device having input ports corresponding to the predetermined capacity of the optical fibers. The ATM edge device grooms the ATM cells by rejecting unauthorized cells and idle cells that do not carry information, and maps the remaining ATM cells to output ports having a lower predetermined capacity than the plurality of optical fibers coupled to the receivers. The mapped ATM cells are assigned translated VPI/VCI identifers and are combined onto common signal paths for transport via optical fibers, thereby maximizing the capacity and efficiency of the network. The network also enables subscribers to set up fully interactive broadband sessions with selected VIPs via level 1 and level 2 gateways between the subscriber and the selected VIP.

50 Claims, 4 Drawing Sheets

FULL SERVICE NETWORK USING ASYNCHRONOUS TRANSFER MODE MULTIPLEXING

TECHNICAL FIELD

The present invention relates to full service digital broadband networks offering a full range of digital communications by transporting compressed, digital information using Asynchronous Transfer Mode (ATM) technology.

BACKGROUND ART

Distribution of full motion video data has evolved from early television broadcasting to meet viewer demand. Earliest video distribution was by point-to-point wiring between a camera and a video monitor. This was followed by scheduled television broadcasting of programming over the public air waves. In the 1960's, Community Antenna Television (CATV) was chartered to provide off-air television signals to viewers in broadcast reception fringe areas. Later, under FCC regulation, the CATV industry was required to provide local access and original programming in addition to off-air broadcast signal distribution.

As a result, several sources of cable network programming were established. Because of the wide bandwidth available on cable television systems, additional channels were available for the new programming. However, programming wasgenerally prescheduled, with the viewer left to tune to the designated channel at the appointed time to view a particular program.

To increase revenues, cable television systems have initiated distribution of premium channels viewable only by subscribers having appropriate descramblers. The subscriber tunes the descrambler to receive a premium channel, descramble the video and audio information and supply a signal capable of reception on a standard television set. The variety of available programs, from broadcast networks such as CNN, ESPN, to specialized Pay-Per-View events, has prompted distribution networks to develop more efficient transmission and distribution techniques for information data including video, audio, text, and plain old telephone service (POTS).

Prior systems relied on wire transmissions to transmit analog signals within a limited bandwidth. For example, CATV video distribution systems have historically transmitted analog video information to homes and businesses using coaxial cable. There is a trend in the communications industries to develop digital systems in order to provide more efficient transmission of information. This development is found in digital cellular telephone systems, facsimile transmission systems, and video distribution systems. In particular, a number of systems have recently been proposed for distributing video information in compressed, digital data form.

In addition, several different wideband digital distribution networks have been proposed for offering subscribers an array of video services, including true Video On Demand service. The following U.S. patents disclose representative examples of such digital video distributions networks: U.S. Pat. Nos. 5,253,275 to Yurt et al., 5,132,992 to Yurt et al., 5,133,079 to Ballantyne et al., 5,130,792 to Tindell et al., 5,057,932 to Lang, 4,963,995 to Lang, 4,949,187 to Cohen, 5,027,400 to Baji et al., and 4,506,387 to Walter. In particular, Litteral et al. U.S. Pat. No. 5,247,347 discloses a digital video distribution network providing subscribers with access to multiple Video On Demand service providers through the public switched telephone network, as described in more detail below.

U.S. Pat. No. 5,247,347 to Litteral et al., assigned in common with the present invention and incorporated herein in its entirety by reference, integrates a public switched telephone network with video-on-demand service. Specifically, the disclosed video-on-demand system adopts existing components of the Public Switched Telephone Network (PSTN) and implements compression techniques to store video information for subsequent forwarding over interoffice facilities. The switching facilities are located in central offices (COs) serving residential customers or subscribers. Electronic devices associated with the subscriber loops modify the transmission characteristics of the subscriber loops to permit delivery of full motion video information over existing loop plant facilities.

The networks of the prior art typically have not been designed to accommodate a full range of digital services such as telephone, video, video-on-demand, data services, information services, interactive services, and other modern digital offerings.

A disadvantage of systems using the PSTN as a video distribution system is that they are often bandwidth limited, providing only still frame or video conferencing capabilities. Because the systems use the PSTN only for connectivity between subscribers and/or between subscribers and Video Information Providers (VIPs), there is no capability for dynamic routing of digitized video without requiring dedicated leased, wide bandwidth circuits.

Attempts have been made to improve the core switching, multiplexing and transmission technologies for integrated digital networks to support voice, data and video services from VIPs for multiple users. For example, fiber optic transmission systems with bandwidths ranging from 155.52 to 2,488.32 Mbps have been considered to improve bandwidth access. In addition, asynchronous transfer mode (ATM) has been developed as a technique to provide broad-bandwidth, low delay, packet switching and multiplexing. In ATM, usable capacity can be assigned dynamically (on demand) by allocating bandwidth capacity to fixed-sized information-bearing units called "cells". Each cell contains header and information fields. The ATM standard, CCITT.121/2 specifies a 53 byte cell which includes a 5 byte header and a 48 byte payload.

MPEG (moving picture experts group) is a broad generic standard for digital video program compression. A number of specific compression algorithms satisfy MPEG requirements. MPEG-2 is a second generation compression standard capable of encoding video program material into a 6 Mbits/sec bit stream and packetizing a number of 6 Mbits/sec channel streams into a single higher rate signal transport stream. The conversion of MPEG-2 data into ATM cell format, however, imposes additional overhead requirements that reduce the information-carrying capacity of the network. For example, certain transmission protocols may require a stream of continuous data. Thus, an ATM data stream carrying MPEG video data may need to be padded with ATM idle cells, or "dummy cells", in order to ensure proper synchronization with the physical layer. Therefore, the network's information-carrying efficiency is reduced each time information data is converted to another layer of transport.

In addition, there has been a growth of VIPs offering video services to subscribers. The growth in the number of VIPs offering services will result in capacity problems on the PSTN connecting the VIP services to their subscribers. In addition, any one VIP may not fully utilize the physical connection to the PSTN when providing video services. Thus, if a plurality of VIPs each use an assigned optical fiber at, for example, fifty percent capacity, the PSTN will be inefficiently utilized if the optical fiber of each VIP is connected to the PSTN internal switches. Thus, there is a need for increased bandwidth and efficient connectivity techniques in the PSTN as competition increases between VIPs for connectivity to subscribers.

DISCLOSURE OF THE INVENTION

In view of the foregoing, an object of the present invention is to provide a digital broadband communications system that efficiently transports communications data in ATM format from a plurality of information providers to a plurality of users.

It is another object of the present invention to provide a digital broadband communications system that maximizes the supply of ATM streams from a plurality of information providers to signal paths for distribution in a network.

It is still a further object of the present invention to increase information-carrying efficiency by eliminating unnecessary overhead from ATM cell streams.

In order to achieve these and other objects of the present invention, a digital broadband communication system transports ATM streams carrying broadband data supplied from a plurality of video information providers to at least one subscriber. The system selectively rejects portions of the supplied ATM streams before transportation on the network.

More specifically, a full service network in accordance with the present invention uses ATM multiplexing to provide a plurality of digital video and telephonic services to subscribers. The full service network is adapted to receive MPEG-2 video data in ATM stream format from a plurality of video information providers. The network comprises an ATM edge device, which receives the ATM streams from the video information providers and performs policing and grooming on the input ATM cell streams. The ATM edge device outputs the groomed ATM streams on the basis of their corresponding virtual path/virtual circuit identifying (VPI/VCI) headers to a plurality of host digital terminals (HDT's) distributed throughout a service area. The HDT's output the ATM streams to a subscriber's digital entertainment terminal (DET) via an optical network unit (ONU). The DET captures each ATM cell bearing a specified VPI/VCI header corresponding to a selected program channel.

The ATM edge device of the present invention manages the incoming ATM streams to optimize the transmission of the ATM streams across the network. The ATM edge device performs policing by monitoring the incoming data rate of an ATM stream from a specified VIP; if the ATM stream is being received from the VIP at an unauthorized data rate, the ATM edge device prevents the excess ATM cells from being passed through the network.

In addition, the ATM edge device performs a screening function and a grooming function of ATM cell streams to determine, on a cell-by-cell basis, whether the ATM cell streams should be transmitted on the network. The ATM edge device performs screening by analyzing the validity of the VPI/VCI header; if the VPI/VCI header does not have valid information (i.e., an unrecognized virtual path), the ATM cell is dropped from the ATM stream. In grooming, the ATM edge device analyzes the received ATM cell by its header to determine if the cell contains valid data, i.e., if the cell payload contains useful information for a user; if the ATM contains valid cell data, the ATM edge device maps the ATM cell to a translated virtual path by assigning a new VPI/VCI header and outputting the translated ATM cell to a new output signal path. If, however, the ATM cell does not contain valid payload data, for example, if the cell is an idle cell, the ATM edge device rejects the ATM cell. In addition, the ATM edge device may map ATM cells having valid data to a null port, thereby preventing transmission on the network.

As a result, the ATM edge device monitors incoming ATM cell streams to ensure that only valid ATM cells carrying payloads with user information pass through the network. Thus, the ATM edge device improves the information-carrying capacity of the network by combining the different ATM cell streams from the corresponding VIPs onto output ATM cell stream paths without extraneous ATM cells.

The HDT's are adapted to provide broadcast and interactive video service to the subscriber's digital entertainment terminal, which is dynamically programmed through the broadband communications network. A downstream, broadband, digital communication link is established between a digital entertainment terminal and one service provider. The terminal receives software executable by the control processor from the selected service provider via the downstream, broadband, digital communication link. The received software is stored in a memory within the digital entertainment terminal. During subsequent reception of digitized audio and video information over the downstream, broadband, digital communication link, the control processor retrieves the software from the memory. The processor executes the software to control interactions between the user and the selected service provider and to produce audio/video information outputs to the user responsive to the received digitized audio and video information.

These and other features of the present invention will become more apparent upon review of the best mode for carrying out the invention, disclosed below.

BEST MODE FOR CARRYING OUT THE INVENTION

Figure 1:
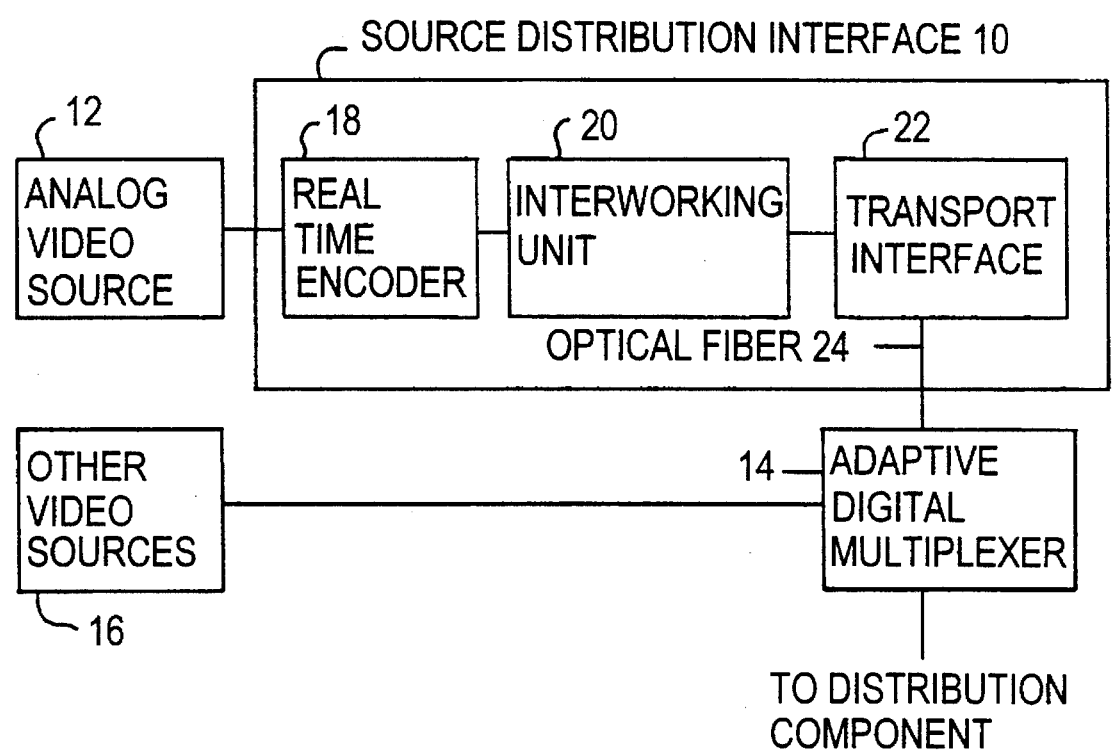
FIG. 1 discloses a block diagram of an interface for a digital broadband network that receives ATM cell streams.

An example of ATM transmission techniques is disclosed in commonly-assigned co-pending application Ser. No. 08/250,792, filed May 27, 1994, entitled FULL SERVICE NETWORK, incorporated herein by reference in its entirety. The apparatus disclosed in application Ser. No. 08/250,792 uses ATM processing for video information, including broadcast video information. For example, FIG. 1, corresponding to FIG. 2 of application Ser. No. 08/250,792, discloses a source interface 10 between a baseband analog video source 12 and an adaptive digital multiplexer 14 that monitors ATM streams to be supplied to a distribution network. The adaptive digital multiplexer 14 also receives an ATM stream from a second video source 16. The source interface 10 includes a real time encoder 18 which digitizes and compresses in MPEG-2 format the audio and video signals from the video source 12. The real time encoder 18 processes six sets of analog audio/video program signals in parallel, and outputs six 6.312 Mbit/s MPEG-2 bit streams as a single 45.736 Mbit/s DS-3 signal to an interworking unit 20.

The interworking unit 20 prepares the MPEG-2 bit streams for ATM cell stream transmission over optical fiber transport links. For example, the interworking unit 20 will divide the bit stream into segments of appropriate length payloads and combine the payloads with ATM headers to obtain ATM cell stream. The ATM cell stream is supplied to the transport interface 22, which converts the ATM cell stream to optical signals for transmission to the adaptive digital multiplexer 14 via an optical fiber 24 using, for example, an optical fiber transmission standard such as OC-12.

The adaptive digital multiplexer 14 determines whether the entire OC-12 channel capacity of the optical fiber 24 is being utilized by the interface 10. If the optical fiber 24 is not being utilized at capacity, then the adaptive digital multiplexer 14 permits the second broadcast service 16 to use the transport capacity not used by the first broadcast source 12.

Figure 2:
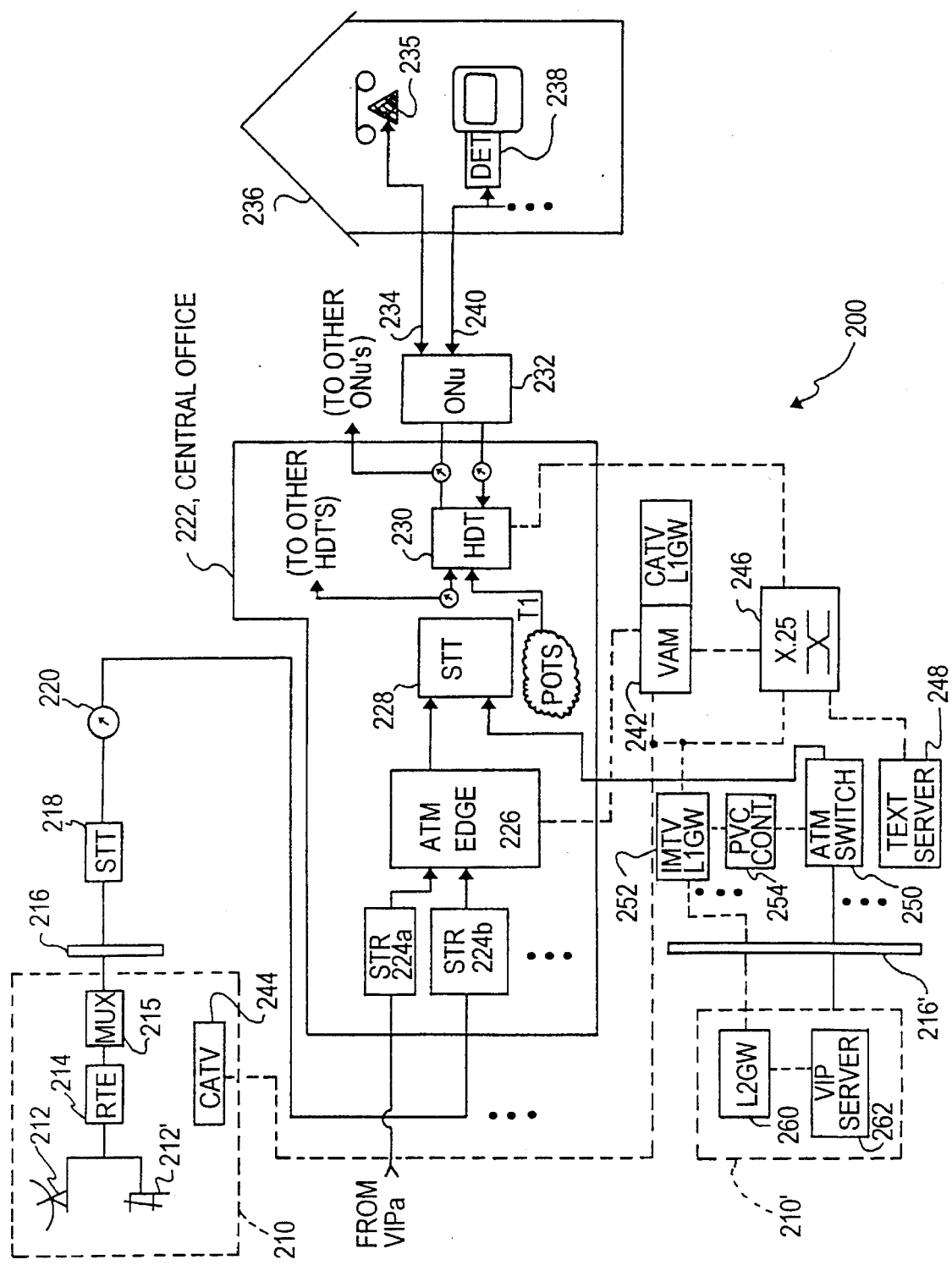
FIG. 2 discloses a block diagram of a full service digital broadband network according to a preferred embodiment of the present invention.

FIG. 2 discloses an architecture of a digital broadband network 200 in accordance with a preferred embodiment of the present invention. The disclosed network 200 transports video services including broadcast video distribution, video on demand, interactive text services, from broadcast video sources such as video information providers (VIPs) to subscribers located within the LATA of the network 200. In addition, the disclosed network 200 may include point-to-point switching capabilities in order to provide interactive multimedia television (IMTV) services.

As shown in FIG. 2, the network 200 receives broadcast video services from a broadcast video source or headend 210. The broadcast video source 210 generates a standard analog signal, for example an NTSC television signal, from any analog source, such as a satellite antenna 212 or RF antenna 212'. The baseband signals from the source 212 are applied to a real time encoder (RTE) 214.

The real time encoder 214 digitizes the audio and video program signals and performs data compression. A number of different digitizing and compression techniques can be used. The encoder 214 preferably encodes the program signal into an MPEG-2 compression format.

The MPEG-2 standard, recognized in the art, provides a standardized syntax and format for packetizing the compressed audio and video information and for transporting other data. Under the MPEG-2 standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although video frames can vary in length, the transport packets have a fixed 188 byte size. Thus, different frames are broken down into different numbers of MPEG transport packets. For example, for a 6 Mbits/sec encoding system, a group of frames consisting of a total of 15 frames for one-half second of video breaks down into approximately 4000 transport packets.

Transport stream packets consist of two sections, a 4 byte header section, an optional adaptation field and a payload section. The header information includes, inter alia, a synchronization byte, a variety of different flags used in reconstruction of the video frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program source from which they originate.

Periodically, the transport packet for each program will also include a program clock reference (PCR) value within the optional adaptation field. For example, the PCR may be present in only 10 out of every 4000 video transport packets.

The encoder 214 compresses up to six NTSC analog audio/video program signals in parallel into an MPEG-2 format. The resulting six MPEG-2 packet streams with the appropriate overhead information are combined into a single MPEG-2 stream at 45 Mbits/sec (DS-3).

The DS-3, MPEG-2 transport stream is output from the encoder 214 and supplied to an ATM multiplexer 215 which converts the MPEG-2 packets for the six programs into a single ATM cell stream containing all six programs at the DS-3 rate. Asynchronous transfer mode or "ATM" transport is an advanced, high-speed packet switching technology. In ATM, information is organized into cells having a fixed length and format. Each cell includes a header, primarily for identifying cells relating to the same virtual connection, and an information field or "payload". According to the preferred embodiment, a 53 byte ATM cell includes a cell header consisting of 5 bytes and a payload consisting of 48 bytes of payload data. The ATM cell header information includes a virtual path identifier/virtual circuit identifier (VPI/VCI) to identify the particular communication each cell relates to.

In ATM, transfer is asynchronous in the sense that the recurrence of cells that contain information from any particular sender is not necessarily periodic. Each device using the ATM network submits a cell for transfer when they have a cell to send, not when they have an assigned or available transmission time slot. However, the ATM cells may ride in synchronous slots on a high-speed time division multiplexed media, such as a SONET optical fiber. ATM allows any arbitrary information transfer rate up to the maximum supported by the ATM network, simply by transmitting cells more often as more capacity is needed.

According to the preferred embodiment, the ATM multiplexer 215 converts the MPEG-2 bit streams into cellular payload data, adds cell headers, and outputs the ATM stream to a network interface 216, which serves as the interface between the network 200 and the VIP 210. In other words, the ATM multiplexer 215 breaks out the individual programs into cell payloads and adds header information (including VPI/VCI) to map the programs into ATM virtual circuits in the corresponding output cell stream. As noted above, each MPEG packet consists of 188 bytes, whereas each ATM cell includes 48 bytes of payload data. The preferred mapping scheme uses two different adaptations. The first adaptation maps one 188 byte MPEG packet into five ATM 48 byte cell payloads. The second adaptation maps two 188 byte MPEG packets into eight ATM 48 byte cells payloads.

MPEG packets of 188 bytes map efficiently into ATM cells if pairs of packets are mapped into 8 cells. However, a delay is imposed on mapping of a first cell while waiting for the second cell in the pair. To minimize jitter at the decoder, the packets carrying the PCR need to be encoded and transported quickly. To avoid delaying first packets containing a PCR while processing a second packet, the ATM multiplexer 215 maps first packets containing a PCR immediately, using the five cell adaptation procedure. As noted above, the PCR is typically present in only 10 out of every 4000 packets. Also, at least some of those 10 likely will arrive as the second packet of a pair. Consequently, only a very small number of packets are mapped using the less efficient 5-cell adaptation.

As noted above, each cell of a particular stream will have a header which contains a virtual path identifier/virtual circuit identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, each ATM cell carrying video information for a specified program from a video information provider can be identified on the basis of its corresponding VPI/VCI.

The transmission of ATM cells in an asynchronous DS-3 signal requires a common clock reference in order to ensure frame alignment between the ATM multiplexer 215 and a super trunk transmitter 218. In a particular aspect of the present invention, the network interface 216 receives the six MPEG-2 channels in ATM cell format from the ATM multiplexer 215 in accordance with a physical layer convergence protocol (PLCP). The PLCP is a framing structure used to ensure that ATM cells are aligned with respect to a corresponding video frame, even though there may exist drifting of a start and end of a typical DS-3 frame. Specifically, the PLCP references a DS-3 header and identifies the location of each ATM cell with respect to the DS-3 header. Since the DS-3 frame contains a maximum of twelve ATM cells, the PLCP notes the location of each of the cells 1–12 with respect to the DS-3 header. Therefore, even though there may be DS3 frame drifting, the PLCP ensures alignment, from a cell perspective, between the cell layer and the DS-3 frame so that each of the twelve ATM cells within each DS-3 frame can be located.

The interface 216 serves as the actual input point for the encoded broadcast information into the network 200 of the present invention. All broadcast service type video information providers (VIP's) 210 supply programming to the network 200 in the form of a DS-3 type, MPEG-2 encoded ATM streams at the interface 216.

Each super trunk transmitter 218 is capable of receiving DS-3 ATM cell streams from up to sixteen sources, for example, VIP 210. The super trunk transmitter 218 combines those cell streams into a single stream, converts the electrical cell stream into an optical signal stream and transmits the optical stream over a fiber 220. If the optical transmissions are SONET compliant, the super trunk transmitters 218 and super trunk receivers 224 would operate at an OC rate to transport a standard number of DS3 bit streams. For example, OC-12 equipment will transport 12 DS3 bit streams, OC-18 will transport 18 DS3 bit streams, etc. It would also be possible to use an asynchronous optical protocol.

The preferred embodiment uses super trunk transmitters and receivers manufactured by Broadband Technologies, Inc. of Research Triangle Park, N.C. The preferred super trunk transmitters (STT's) 218 are capable of receiving DS3 bit streams from up to sixteen sources, for example up to sixteen encoders 214. Each super trunk transmitter 218 combines those DS3 rate bit streams into a single higher rate bit stream, converts that electrical stream into an optical signal stream and transmits the optical stream over a fiber.

The optical fibers each transport up to 16 DS3 streams, wherein each DS3 includes 6 MPEG-2 encoded program signals, for a maximum capacity on the fiber of 96 channels. The network 200 preferably will service up to 50 VIPs.

The trunk fibers 220 are routed to a central office 222 that services a given local access and transport area (LATA). The central office 222 includes super trunk receivers 224, each of which recovers up to 16 DS-3 ATM cell streams from the corresponding optical signal stream. The DS-3 ATM cell streams from each of the super trunk receivers 224 are supplied to an ATM edge device 226, which performs policing and grooming on the input ATM cell streams. Alternatively, the ATM edge device can accept a separate DS-3 input stream. The ATM edge device 226 performs a timing function to align the groomed ATM stream and outputs the groomed ATM stream to a super trunk transmitter 228. The preferred embodiment can carry up to 384 broadcast program channels over a capacity of 64 DS-3 signal paths. In that embodiment, a group of four STT's 228 receive the 64 DS-3 ATM streams from the ATM edge device 226, and outputs the ATM streams over four parallel optical fibers.

According to the present invention, the ATM edge device 226 monitors incoming DS-3 data streams and determines whether ATM cells within the data streams should be passed to the network or blocked. In other words, the ATM edge device 226 acts as a groomer for multiple VIP terminations to prevent extraneous data from using network resources. Also, the ATM edge device 226 performs policing of DS-3 ATM cell streams by monitoring the data rate of incoming data streams from VIPs. For example, if the VIP has subscribed by contract to transmit a data stream at 3 Mbit/s to the network, the ATM edge device 226 will prohibit or drop ATM cells that are transmitted above the subscribed bit rate, for example at 6 Mbit/s; in this case, the 6 Mbit/s stream would be rejected such that only 3 Mbit/s of the stream would be passed, rendering the passed data useless at the receiver.

In addition, the ATM edge device 226 provides a grooming function, whereby ATM cells are analyzed, on a cell-by-cell basis, to determine if they should be transmitted on the network. Specifically, each ATM cell is mapped on the basis of its corresponding VPI/VCI header either to a valid DS-3 output port, or to a null port. In addition, the ATM edge device 226 maps the ATM idle bits containing no information that are present in the DS-3 ATM stream to a null port, thereby rejecting the received ATM idle bits. As shown in FIG. 2, this ATM cell mapping, also referred to as cell translation, enables DS-3 ATM cell streams that are transmitted at less-than-full capacity to be mapped onto at least one DS-3 stream operating at full capacity. A more detailed description of the ATM edge device is disclosed below with reference to FIG. 3.

The ATM edge device 226 outputs at least one DS-3 stream of combined ATM streams to a supertrunk transmitter (STT) 228. Although not shown, the ATM edge device 226 will preferably output up to 64 DS-3 ATM streams to the STT 228. As discussed in detail below, each ATM cell of the combined ATM stream has a VPI/VCI identifier that is responsive to a mapping function in the ATM edge device 226; thus, a multiplexed ATM cell may have a modified VPI/VCI identifier. The STT 228 combines the DS-3 ATM cell streams into an optical stream in a manner similar to STT 218. The signal stream on each optical fiber from the STT 228 is applied to a bridge circuit (not shown) to supply the optical signal stream through trunk fibers to a large number of Host Digital Terminals (HDT's) 230 distributed throughout the serving area. The bridge circuitry includes passive bridging elements and may include active bridging elements. Each HDT 230 handles up to 256 subscribers by switching DS-3 ATM streams carrying selected program channels onto optical fibers to up to 64 optical network units 232 (ONU's). The ONU's 232 transfer the DS-3's over respective coaxial cables to subscriber terminals for display on associated television sets.

It will be readily apparent that while the HDT 230 is disclosed as part of the central office 222, the physical location of the HDT's 230 would actually be throughout the area serviced by the central office 222. The optical fiber from the HDT 230 to each connected ONU preferably transports 24 DS-3 ATM cell streams, 2-way telephone communications and 2-way signaling channels. In some embodiments, the network includes two fibers between the HDT and each ONU, one for downstream traffic and one for upstream traffic. The optical fiber from the HDT 230 to each ONU 232 may use either an asynchronous optical protocol, or a synchronous (SONET) OC rate transport. The ONU's 232 provide appropriate interfacing between the voice channels on the fibers and twisted wire pair 234 for telephone service into the subscriber premises.

In addition, each living unit is preassigned three DS-3 slots on the basis of the fiber from the HDT 230 to the ONU 232 for broadband service. Each home or living unit 236 is preferably allocated a capacity of four digital entertainment terminals 238 (DET's), with three being active at any one time. A coaxial drop 240 for each living unit 236 carries 180 Mbits/s baseband digital data, which will simultaneously transport three 45 Mbits/s DS-3 ATM streams. The three channels for a particular living unit 236 on the fiber from the HDT 230 to the ONU 232 and on the drop cable 240 are individually assignable to different DET's 238 within the subscriber's premises 236. The ONU 232 performs optical to electrical conversion, separates out the DS-3's received over the optical fiber from the HDT 230 and supplies the selected DS-3 ATM stream to appropriate channels on the coaxial cables going to the respective subscriber premises.

As part of an initial handshaking procedure, when a subscriber turns on a DET 238, a DS-3 channel on the fiber to the ONU 232 serving the subscriber and a corresponding DS-3 on the particular subscriber's coaxial drop cable 240 are assigned to the DET 238. Upstream and downstream slots are also assigned for signaling purposes, as part of the initial handshaking. When a subscriber requests a broadcast channel, the DET 238 provides a subscriber selection signal identifying the selected channel through the ONU 232 to the HDT 230. In response to the subscriber selection signal, the HDT 230 identifies the DS-3 on one of the 4 trunk fibers from the STT 228 carrying the requested broadcast program. The HDT 230 then switches the identified DS-3 ATM stream to the assigned DS-3 channel on the fiber going to the corresponding ONU 232 and transmits a signal to the DET 238 identifying the particular ATM virtual circuit (VPI/VCI) within that DS-3 stream which carries the requested broadcast program. The ONU 232 routes the particular DS-3 to the appropriate channel on the requesting subscriber's coaxial drop cable 240 going to the subscriber's premises.

Although not shown, the DET includes a network interface module (NIM) for connecting to the coaxial drop cable 240 to send control signals to the ONU 232 and receive video and data signals from the ONU 232. The DET 238 includes means to selectively demodulate received data from an assigned one of the three DS-3 slots on the coax cable 240. Specifically, the DET captures each ATM cell bearing the specified VPI/VCI header information corresponding to the selected program channel from the DS-3 stream.

The DET 238 includes a receiver that captures each ATM cell having a specified VPI/VCI. The receiver buffers cells until it finds a cell having an ATM cell Adaptation Unit (AAU) value of "0" in its header (first cell) and another cell having an AAU value of "1" in its header (last cell). The receiver counts the number of cells from first to last to determine the type of adaptation used to map cells.

If the receiver has captured five cells, the receiver pulls out the payload data and uses the CRC data to check for errors. If there are no errors, the original MPEG packet is reconstructed from the appropriate bytes of payload data from the first four cells. Similarly, if the receiver has captured eight cells, the receiver pulls out the payload data, does the CRC based error check, and if there are no errors, the original pair of MPEG packets is reconstructed from the appropriate bytes of payload data from the eight cells.

On decompression, the MPEG-2 decoder in sequence reconstructs the frames for a particular program from packets bearing the appropriate PID value, decompresses the compressed digital video information, and displays the decompressed digital video information in the appropriate format.

The DET also includes a CPU, comprising a 386 or 486-type microprocessor and associated memory (RAM, ROM and EPROM). Digital signal processors, controlled by the CPU, decompress the received MPEG video and audio signals. The DET 238 also includes a graphics display generator for generating displays of text data, such as the initial turn-on selection menu for overlay on or replacement of a video program stream. The DET also includes digital to analog converters and appropriate drivers to produce output signals compatible with a conventional television set.

According to the preferred embodiment, the DET 238 is a programmable device with software for broadcast channel selection and decoding residing permanently in the DET memory. Additional software may be downloaded into the DET 238 as applications programs to facilitate certain interactive services. A more detailed description of the structure of the DET and the operations thereof involved in downloading applications software and operating system changes into the DET are disclosed in copending application Ser. No. 08/250,791, filed May 27, 1994, incorporated herein in its entirety by reference.

Each DET 238 includes means to receive selection signals from a user via remote control, and as noted above, the DET 238 responds by transmitting appropriate data signals over a narrowband signaling channel on the coaxial drop cable to the ONU 240. According to the preferred embodiment, the narrowband signaling channel uses a consumer electronics (CE) bus protocol. With the CE bus protocol, for example, the DET's 238 outputs are read in sequence by the ONU 232, and in response to this reading, each DET 238 transmits channel selection data upstream through the ONU 232 to the HDT 230.

The ONU 232 multiplexes the data signals from the DET's it services together and transmits those signals to the HDT 230 over an upstream channel on an optical fiber. If the data represents selection signals, the HDT responds to that data as outlined above, and stores data identifying each subscriber's selections for subsequent periodic uploading to a Video Administration Module (VAM) 242. The HDT's 230 connect to the VAM through a first X.25 packet data communication network 246.

The operations of each HDT 230 are controlled by data tables stored within the HDT. The video information providers (VIP's) provision various services for their subscribers by establishing appropriate mapping and profile data in the tables in the HDT's 230. The VIP's, however, do not have direct access to the data tables within the HDT's. Instead, the VIP's access the VAM 242 through a personal computer interface 244 and the X.25 data communication network 246. The VIP's 210 provide provisioning data to the VAM 242, and the VAM 242 periodically downloads that data to the appropriate HDT's 230.

The provisioning data downloaded to the HDT's 230 includes channel mapping information and subscriber authorization control information. The channel mapping information specifies what programs are carried on each ATM virtual circuit, within each DS-3, on each respective optical fiber. The HDT 230 accesses the channel mapping information in response to each program selection by a subscriber to route the correct DS-3 to the requesting DET 238 and to inform the DET 238 as to which virtual circuit within that DS-3 carries the requested program. The authorization control data indicates which programs each subscriber is authorized to access, e.g. because that party has subscribed to the particular program service. When a subscriber requests a program, the HDT 230 checks this data to determine whether or not to supply the program to the subscriber's DET 238.

Figure 3:
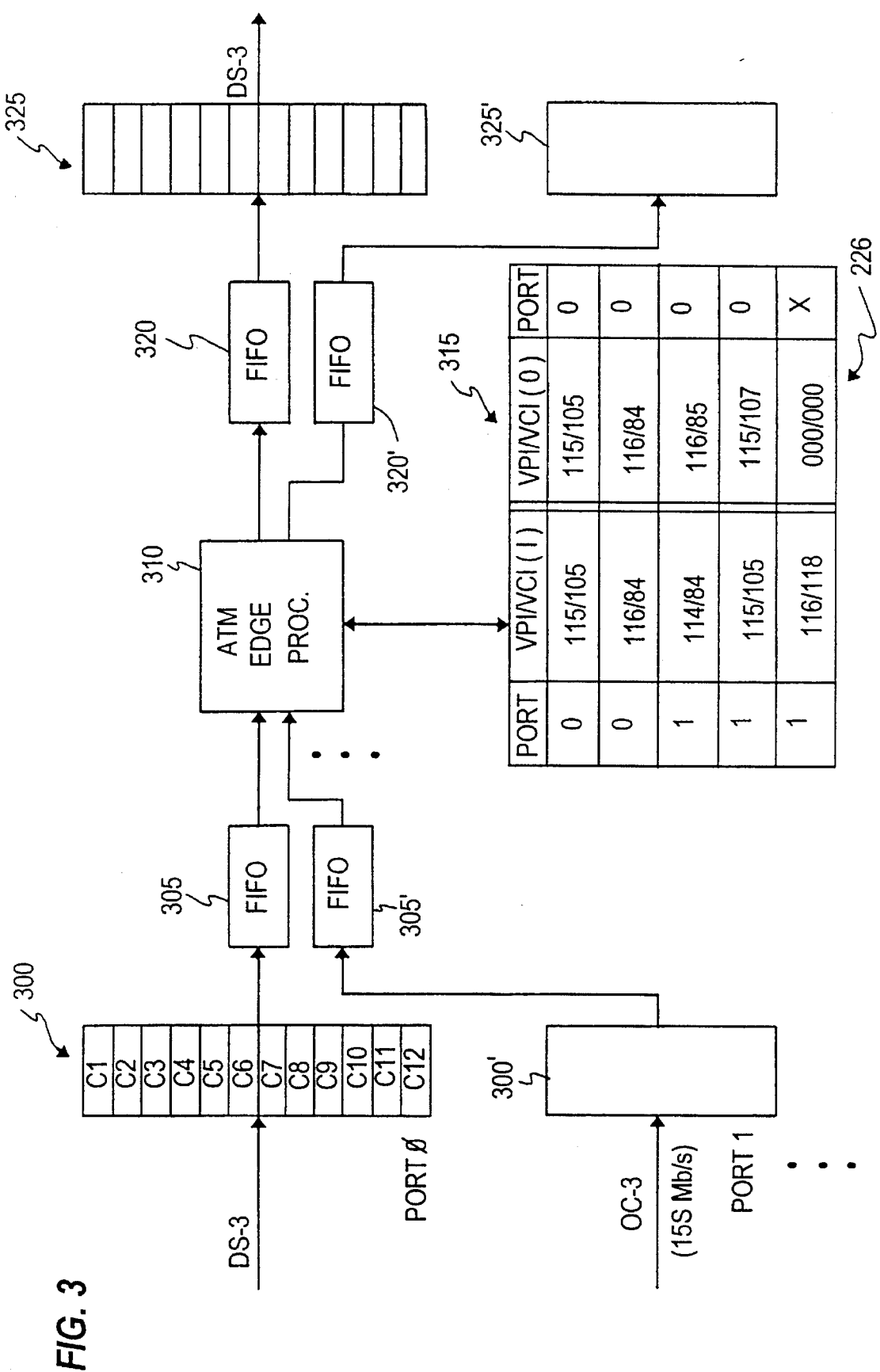
FIG. 3 discloses a block diagram of the ATM edge device disclosed in FIG. 2.

FIG. 3 discloses a block diagram of the ATM edge device 226 disclosed in FIG. 2. As shown in FIG. 3, the ATM edge device 226 includes a DS-3 input port 300, an ATM edge processor 310, an ATM look-up table 315, and a DS-3 output port 325. Typically, the ATM edge processor comprises at least 64 input ports that receive a DS-3 input streams from the corresponding STRs 224 that receive the signals from the optical fibers 220 from the plurality of VIPs. As shown in FIG. 3, each input port 300 performs DS-3 framing to extract the ATM cells, and outputs the extracted ATM cells to a FIFO output buffer 305 for use by the ATM edge look-up table 310.

The DS-3 input port 300 performs the DS-3 framing by monitoring the incoming DS-3 stream, which provides a frame rate of 8000/sec. Since each DS-3 frame includes 12 ATM cells, the DS-3 input port 300 locates 12 ATM cells every 125 microseconds. The DS-3 input port 300 identifies the next free frame from the DS-3 stream, and analyzes the DS-3 headers. As discussed above, the DS-3 frames use PLCP framing to maintain alignment between the ATM cell layer and the DS-3 stream. Thus, the input port 300 locates the PLCP pointers in the DS-3 header to identify the start of the PLCP frame, which corresponds to cell 1 (C1), as well as the remaining cells C2–C12. After the ATM cells are identified, the input port 300 extracts the ATM cells and supplies the extracted 53-byte ATM cells to the FIFO buffer 305.

Since the ATM edge device 226 includes a plurality of input ports 300, the ATM edge processor 310 processes ATM cells from different DS-3 streams on a first-come, first-served basis. Thus, there may arise a situation where two ATM cells from different DS-3 streams may have the same destination simultaneously. In such a case, the ATM edge processor 310 processes one ATM cell before the other and the second ATM cell has a cell delay due to waiting in queue.

Alternately, the ATM edge device 226 may include an OC-3 input port 300' in order to directly receive optical fiber signals having OC-3 format. In such a case, the OC-3 signals are received synchronously at 155 Mbit/s. In order to extract the ATM cells, the OC-3 input port 300' analyzes the input stream in 5-byte increments in order to check the header/ error/check (HEC) sequence for valid ATM data; if the input port 300' verifies the HEC sequence, the 53-byte ATM cell is extracted and supplied to the FIFO buffer 305'.

As discussed above, although each optical fiber 220 has a capacity of transporting 16 DS-3 ATM streams, the optical fiber 220 typically will not be operated at capacity, especially when VIPs using the optical fibers have varying bandwidth requirements over time. For example, a VIP providing business news may require more bandwidth for daytime news programming, whereas a VIP providing entertainment programming may require more bandwidth during evenings and weekends. According to the present invention, the ATM edge processor 310 processes all incoming DS-3 ATM streams from all the optical fibers 220, and maps the DS-3 ATM streams into at least one condensed, or combined ATM stream for transmission through the network 200. Thus, the ATM edge processor 310 is able to fully load the optical fibers serviced by the STT 228 to fully load the capacity of the network.

Figure 4:
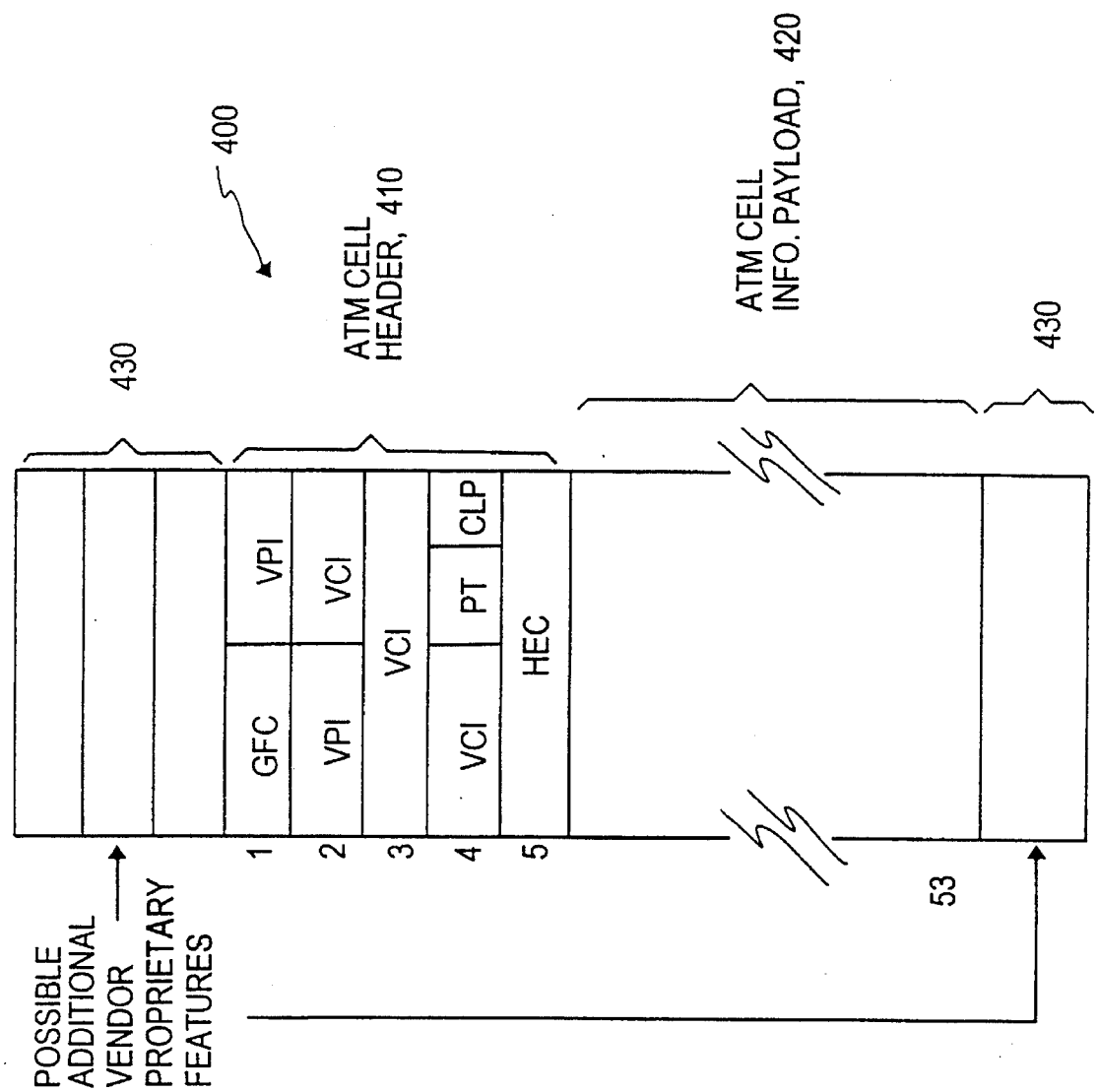
FIG. 4 discloses an exemplary structure of an ATM cell.

FIG. 4 discloses an ATM cell structure according to the preferred embodiment of the present invention. The ATM cell 400 includes a header section 410 and a payload section 420. In some implementations, the ATM cell 400 may include additional overhead sections 430 that provide additional vendor-proprietary features, such as priority level assignments, or forward error correction. The first byte of the header section 410 includes a 4-bit Generic Flow Control (GFC) word which is used in shared medium access environments (e.g., local area networks) to provide access control; in the disclosed embodiment, the GFC word is not used, and hence the field is set to all zeros. The first byte of the header section 410 also includes the lower four bits of an 8-bit virtual-path identifier (VPI). The second byte of the header section 410 includes the upper four bits of the VPI and the first four bits of a 16-bit virtual circuit identifier (VCI). The third byte includes the next eight bits of the VCI. The fourth byte of the header section 410 includes: the last four bits of the VCI; a 3-bit payload type (PT); and a cell loss priority (CLP) bit; and a reserved bit. As indicated above, the fifth byte of the header section 410 includes an 8-bit header error check (HEC) word. The CLP bit is used to manage traffic of ATM cells: in the event of network congestion, cells with CLP set to 1, indicating a lower priority, are dropped before cells with CLP set to 0.

The specific format of the ATM cell is described, for example, in the ATM User Network Interface Specification, Version 3.0, published by The ATM Forum, Mountain View, Calif., also published by Prentice Hall, the disclosure of which is incorporated in its entirety by reference. According to the ATM User Network Interface Specification, the values 0–18 for the VCI are reserved; therefore, any ATM cell having valid data (i.e., payload information for a user) must have a VCI value greater than "18". Thus, the ATM edge processor 310 identifies ATM cells that do not have VCI values greater than "18" as cells that do not carry user information.

Referring to FIG. 3, the ATM edge processor 310 processes the ATM cells from the FIFO buffer 305 on a first-come, first-served basis, determines the input port of the received ATM cell, and performs screening by checking that the cell is carrying valid header information. If the header information in a cell is not valid, the cell gets dropped from the ATM stream. If the header information is valid and the VCI value is greater than 18 indicating valid payload data, the ATM edge processor 310 determines the DS-3 output port and translated VPI/VCI of the ATM cell. The ATM edge processor 310 addresses the ATM look-up table 315 to obtain a translated VPI/VCI, writes the translated VPI/VCI to the ATM cell header, and outputs the translated ATM cell to the FIFO buffer 320 corresponding to the appropriate DS-3 output port 325. If, however, the ATM edge look-up table 315 maps the ATM cell to a null address, the ATM cell is rejected, i.e., groomed, from being passed into the network.

Although not shown, the preferred embodiment of the ATM edge processor 310 will include 64 output ports 325 and a larger amount of input ports 300. Typically, all the input ports 300 will not be simultaneously active; rather, only a portion of the input ports 300 will be active with DS-3 ATM streams. Thus, the ATM edge processor 310 maps the ATM streams from the active DS-3 input ports to the output ports 325.

As shown in FIG. 3, the ATM edge look-up table 315 is addressed on the basis of the identifying address of the DS-3 input port 300 and the VPI/VCI information of the ATM cell. The ATM edge look-up table 315 has a corresponding translated VPI/VCI header value under the column "VPI/VCI(O)", which identifies the translated VPI/VCI header value. For example, an ATM cell from port 0 of input port 300 that has a VPI/VCI header value of "115/105" would have a translated VPI/VCI header value of "115/105", resulting in no rewriting of the header of that ATM cell; however, an ATM cell from port 1 having a VPI/VCI header value of "115/105" would have a translated VPI/VCI header value of "115/107" in order to avoid conflict with the other ATM cells from different ports having the same VPI/VCI header value.

In addition, certain ATM cells may be automatically rejected by the ATM edge look-up table. As shown in FIG. 3, an ATM cell from port 1 having a VPI/VCI header value of "116/118" does not have a valid entry for the translated VPI/VCI output; consequently, the ATM edge processor 310 would drop that ATM cell.

Thus, the ATM edge processor 310 processes ATM cells from a plurality of different input ports 300, and performs grooming by combining ATM cells having a predetermined VPI/VCI header value from a corresponding port onto output ATM streams, whereby the ATM cells are rewritten with translated VPI/VCI header values. The ATM edge processor 310 rejects idle cells, namely ATM cells that do not have any information, and any cells that do not have an entry for translated VPI/VCI header values in the ATM edge look-up table 315. Thus, all ATM idle cells and ATM cells not having authorized VPI/VCI header values in the look-up table 315 are terminated at the ATM edge device 226. Thus, the ATM edge processor improves the effective bandwidth of the network by replacing unnecessary ATM cells with useful ATM cells, thereby maximizing the information-carrying capacity of the DS-3 streams.

As shown in FIG. 3, the ATM edge processor 310 outputs the translated ATM cells onto ATM output streams to the FIFO buffer 320. The ATM cells are then loaded into the output port 325, whereby the output port 325 formats the ATM cells using PLCP framing, and outputs the ATM cells as a DS-3 signal stream.

Referring to FIGS. 2 and 3, the translation values of the ATM look-up table 315 are established by mutual agreement between the network and the VIPs 210. The translation values are provisioned into the VAM and the ATM edge multiplexer by the system administrator. Alternatively, the VAM 242 may be modified to periodically establish a session with the interface 244 of the VIP 210 in order to determine the valid VPI/VCI values of the ATM cells transmitted by the corresponding VIP 210, as well as the authorized transmission rates. The VAM 242 may also be adapted to upload to the VIP interface 244 the translation functions to be performed by the ATM look-up table 315. The VAM 242 may also download the authorized transmission rate and the authorized VPI/VCI values of each VIP 210 to the ATM look-up table 315.

The VAM 242 also downloads the translated VPI/VCI values, e.g., "VPI/VCI(O)", as stored in the ATM look-up table 315 to the HDT's 230. Thus, when a DET 238 requests a particular service from a VIP 210, the corresponding HDT 230 will instruct the DET 238 via its corresponding signaling channel (or broadcast control channel), the translated VPI/VCI value to capture from the ATM stream supplied along the coax drop 240. Thus, the VAM 242 ensures that the DET 238 can access the ATM cells transmitted by the VIP 210 in view of the translated VPI/VCI headers inserted into the ATM cells output by the ATM edge device 226.

According to the preferred embodiment, the network 200 disclosed in FIG. 2 also provides a PIN/password channel control feature, e.g. to permit parents to restrict their childrens' access to certain channels. For this service, a viewer would interact with the HDT to edit the appropriate service profile data for the subscriber into the HDT 230 servicing that subscriber's premises 236. Subsequently, when someone selected one of the restricted channels through one of the DET's 238 on that subscriber's premises 236, the HDT 230 would recognize this from the subscriber's profile data and transmit a signaling instruction to the DET 238 to output a prompting type display and/or audio message requesting input of the PIN or password. The DET 238 would subsequently transmit input information to the HDT 230, and if that input information matches the PIN or password, the HDT 230 would supply the program channel to the DET 238 for display in the above discussed manner. In an alternative implementation, PIN/password routines can be established entirely within the DET 238.

In addition to the channel mapping performed in the HDT 230 to route particular channels to requesting DET's noted above, individual DET's may accumulate certain relevant channel mapping information to facilitate rapid channel changes or "surfing". Surfing of MPEG encoded broadcast channels entails problems involved in locking onto new MPEG data streams because certain data is needed to lock on and begin decoding of MPEG data. In a video on demand or other interactive video transmission service, initial values for all of this data are transmitted in the first few transmitted packets and are retransmitted only when updates are needed. However, in a multi-channel broadcast service, such as disclosed in FIG. 2, the data frames and headers carrying such information are transmitted periodically in each program. The headers and data frames specify program specific information, program allocation maps, program maps, video frame rates, etc. in accord with the MPEG 2 standard. If this data is transmitted often to permit rapid channel changes, then the amount of program payload data decreases. If the data is transmitted less often, the DET must wait longer to obtain the data and begin actual decoding, and the viewer observes a longer waiting period between channels during each change.

To solve these problems, the preferred embodiment caches the necessary MPEG decoding data in the DET 238, as the user scans through the channels. In an alternate implementation, a VIP 244 might initially download the MPEG data for all of a VIP's broadcast programs to the DET 238 as part of a software application downloaded and stored in the DET 238 when the subscriber first accesses a broadcast service VIP. In either case, once the relevant data is cached in the memory of the DET 238, each subsequent time that a user selects a broadcast channel, the DET 238 utilizes the cached data for that channel to attempt to begin decoding that channel. As the DET receives and decodes different channels, the cached data is updated for each channel with any data relating to that channel which may have changed. A more detailed discussion of using DET memory to store broadcast channel decoding data is found in commonly-assigned application Ser. No. 08/380,755, filed Jan. 31, 1995, the disclosure of which is incorporated in its entirety by reference.

The VAM 242 may also periodically upload usage statistics accumulated by the HDT's to the relevant VIP's through the X.25 data network 246. Although not necessarily co-located with the encoders 214 and ATM multiplexers 215 through which each VIP 210 supplies programming to the network 200, each VIP 210 presumably will operate some form of computerized billing and authorization control processor for converting the usage information into billing data and for generating program mapping and authorization data for downloading through the VAM 242 to the HDT's 230.

The present embodiment may also be adapted to provide pay per view event services through the broadcast program channels. A VIP 210 may set up such a service through the VAM 242, so that when a user first requests a particular event, the HDT 230 will supply that event to the user's DET 238 for a five minute preview period. During the preview period, the user has the option to buy the pay per view event by operation of appropriate controls on the DET 238. If so operated, the DET 238 transmits a purchase message upstream to the HDT 230. The HDT 230 later uploads the purchase data and a subscriber identification to the VAM 242, and the VAM 242 will upload that data to the relevant VIP 210 for billing purposes, in essentially the same manner as discussed above relative to usage statistics.

The present embodiment may also provide interactive text services. For these services, the X.25 packet switched data communication network 246 provides communications between the HDT's 230 and gateways and servers 248 operated by information providers. The HDT 230 will format upstream signals transmitted on the narrowband signaling channel from the DET's for X.25 transmission and will transmit VT-100 type text data from a VIP's text server 248 downstream on the narrowband signaling channel to the DET for on-screen display. Examples of such services might include purchase order transaction information relating to items displayed via a home-shopping broadcast channel, overlay of individual player statistics on a broadcast sports program, or multilingual text services.

The present embodiment may also provide transport for interactive broadband services such as video-on-demand. As shown in FIG. 2, an ATM switch 250 provides an ATM stream to the STT 228 to provide point-to-point connections for such services. As discussed in more detail below, the access through this switch 250 is controlled by the Level 1 Gateway (L1GW) 252 in a manner quite similar to the routing to a VIP.

Each non-broadcast service provider 210' preferably has a level 2 gateway (L2GW) 260 and some form of file server 262. A VIP 210' preferably outputs ATM cell streams to the ATM switch 250 for transmission through the network. Alternatively, if the provider's equipment transmits only bit stream data, the network operator would supply an inter-working unit similar to the ATM multiplexer 215 discussed above to convert the provider's bit stream data into an ATM cell stream format compatible with the Full Service Network. The ATM switch transmits selected ATM cells to the STT 228; alternatively, the ATM cells could be directly transmitted via optical fibers to the HDT's 230.

To establish a broadband communication session or connection through the network between an interactive information service provider 210' and a particular DET 238 requires establishment of a virtual circuit through the ATM switch 250 and the appropriate HDT 230. In the network of FIG. 2, a Permanent Virtual Circuit (PVC) controller 254 stores data tables defining all possible virtual circuits through the ATM switch 250 and the HDT's 230 to each terminal of a customer subscribing to a particular provider's services. These data tables define the VPI/VCI and the particular fiber output port used to route cells to the correct HDT 230 and the DET ID information on the downstream fiber to the appropriate ONU 232 serving each DET 238. The data tables thus define "permanent virtual circuits" (PVC's) between the providers and the DET's.

When a subscriber initiates a session with a broadband interactive service provider, for example VIP 210', the subscriber's DET 238 provides an appropriate "off-hook" signal to the HDT 230. The HDT 230 sends the message through the X.25 packet switched network 246 to the Level 1 Gateway (L1G1) 252. When the Level 1 Gateway 252 receives the addressed message from the HDT 230, that Gateway uses the X.121 address of the caller included in the message to check its internal database to determine if the caller is a valid network customer. If the caller is not a valid customer, the system tears downs the session. If the caller is a valid customer, the Level 1 Gateway 252 transmits an X.25 call accept message back to the terminal and waits for the first application level message.

Once the call is accepted and an X.25 signalling link is provided, the DET 238 sends an initiation message that says "hello". This "hello" message includes basic information such as a customer premises equipment (CPE) identifier and a CPE type designation. The Level 1 Gateway 252 sends a menu and a banner through the downstream signaling channel. According to the preferred embodiment, the menu is a screen of text listing VIP's available to this customer or the VIP's that the customer has previously selected for purposes of her customized menu presentation. The subscriber reviews the menu on their television set, and operates the arrow keys on the DET remote control to move a cursor across the menu to an appropriate point on the screen, after which the user presses an <ENTER> key on the keypad or remote control. In response to the VIP selection input, the DET 238 transmits an application select message upstream through the network to the Level 1 Gateway 252.

The Level 1 Gateway 252 may execute a PIN number access routine, if the subscriber has previously requested such access control for selected ones of the VIP's. For simplicity here, it is assumed that the currently selected VIP is not subject to such a PIN number requirement. The Level 1 Gateway 252 is merely expecting to receive the VIP selection input from the DET 238 within a predetermined period following the menu transmission. If the Level 1 Gateway 252 receives the selection input message from the DET 238 within the predetermined period, the Level 1 Gateway 252 translates that message into the 4 digit code for the selected VIP's level 2 gateway 260.

At that time, the Level 1 Gateway 252 sends a message to the DET 238 to wait during connection to the VIP 210'. The Level 1 Gateway 252 then accesses the X.25network 246 to communicate with the selected VIP's level 2 gateway 260. Assuming that the subscriber selected VIP 210', the Level 1

Gateway 252 contacts the level 2 gateway 260 and indicates that it has a customer calling. The Level 1 Gateway 252 identifies the customer to the level 2 gateway 260 by sending the standard DET Global ID for the calling customer to the level 2 gateway 260, i.e., the CPE identification information and the CPE-type information that was sent in the initial origination message is also sent to the level 2 gateway 260 at this time. The VIP's level 2 gateway 260 may accept or reject the call after receiving the initial request indicating a customer is available. If the level 2 gateway 260 sends a message back to the Level 1 Gateway 252 indicating a rejection of the call, the Level 1 Gateway 252 transmits a message to the DET 238 instructing that terminal to display some form of call rejection notice on the associated TV.

Alternatively, the level 2 gateway 260 accepts the call, provides a server output port and gives a port identification for the port on the server 262 to the Level 1 Gateway 252. In response, the Level 1 Gateway 252 transmits the X.121 address of the calling customer's DET 238 to the level 2 gateway 260. The level 2 gateway 260 uses that address to initiate a new signaling communication link through the X.25 network 246, to the appropriate HDT 230 and between the HDT 230 and the subscriber's set-top terminal DET 238. The Level 1 Gateway 252 identifies the HDT 230 serving the requesting customer's DET 238. The Level 1 Gateway 252 sends a message to the PVC controller 254 to establish a virtual circuit between the selected provider 210' and the subscriber's serving HDT 230. The PVC controller 254 accesses its data tables to identify a DS-3 to the HDT 230 and an available permanent virtual circuit within that DS-3, capable of communications between the provider 210' and the DET 238 for which all necessary elements are currently available. When an available circuit is identified, the PVC controller 254 provides appropriate instructions to the ATM switch 250 and informs the Level 1 Gateway 252 of the virtual circuit identifier. The Level 1 Gateway 252 informs the HDT 230 of that virtual circuit identifier and instructs the HDT 230 to "lock-up" that circuit as a currently active virtual circuit providing broadband communications from the server 262 of the provider 210' to the subscriber's DET 238. The HDT 230 switches the DS-3 from the VIP 210' to the DS-3 assigned to the DET 238 and through the ONU 232 the subscriber's coaxial drop cable 240 to the DET 238 in essentially the same manner as for a broadcast service. The VIP also informs the DET 238 of the VPI/VCI header information and the PID values needed to begin reception and decoding of the transmission by transmitting the MPEG program association table (PID=0) so that the DET can locate the program map table.

If the broadband communication connection is successfully established between the VIP's server port 262 and the HDT 230, the PVC controller 254 transmits back an appropriate indication thereof to the Level 1 Gateway 252. The Level 1 Gateway 252 then tears down its own X.25 signaling connection with the subscriber's set-top terminal 238. At the same time, the Level 1 Gateway 252 informs the level 2 gateway 260 that it has set up a good broadband link, and the Level 1 Gateway 252 initiates a billing record for the call. After the level 2 gateway 260 receives confirmation of the connection, the level 2 gateway 260 establishes its own X.25 connection to the DET 238. Alternatively, if the PVC controller 254 informs the Level 1 Gateway 252 that it could not establish the broadband connection, the Level 1 Gateway 252 passes that information on to the level 2 gateway 260 and provides an appropriate message for display by the DET 238 informing the customer.

During the communication session between the subscriber and the VIP 210', the DET 238 can transmit control signalling upstream through the ONU 232, the HDT 230 and the X.25 data network to the level 2 gateway 260. The level 2 gateway 260 can also send signaling information, such as control data and text/graphics, downstream through the same path to the DET 238. For downstream transmission, the server 262 will provide ATM cells with an appropriate header. The ATM switch 250 will route the cells using the header and transmit those cells to the HDT 230 serving the requesting subscriber 236. The HDT 230 will recognize the DS-3 bit stream as currently assigned to the particular DET 238 and will forward those cells through the downstream fiber and the ONU 232 to that DET 238, in essentially the same manner as for broadcast programming.

When an interactive broadband session ends, e.g. as indicated by an exchange of appropriate messages between the DET 238 and the level 2 gateway 260, the level 2 gateway 260 instructs the Level 1 Gateway 252 to tear down the broadband connection. The instruction includes the customer's global ID and the server port identification for the VIP port used for the broadband communication. In response, the Level 1 Gateway 252 stops the billing timing for that broadband session and transmits a disconnect instruction to the PVC controller 254 and the HDT 230 to tear down the broadband connection between the server port and the customer's broadband port. The Level 1 Gateway 252 creates a log record of the interactive broadband call for purposes of billing the VIP 210' for the broadband connect time.

The Full Service Network illustrated in FIG. 2 will also provide narrowband transport for voice and narrowband data services. A digital switch or an analog switch (not shown) will provide standard type plain old telephone service (POTS) for customers of the Full Service Network. The digital POTS switch provides a DS-1 type digital input/ output port through interfaces conforming to either TR008 or TR303. The output may go to a digital cross-connect switch (DCS) 1320 for routing to the various HDT's or directly to a multiplexer (MUX) serving a particular HDT. The MUX may also receive telephone signals in DS-1 format from the analog switch through a central office terminal. The central office terminal converts analog signals to digital and digital signals to analog as necessary to allow communication between the analog switch and the rest of the network.

Although not shown, the MUX for an HDT 230 may multiplex a number of DS-1 signals for transmission over one fiber of an optical fiber pair to the HDT 230 and to demultiplex signals received over the other fiber of the fiber pair. The fiber pairs between the HDT 230 and the ONU's 232 will also have a number of DS-1 channels to carry telephone and narrowband data signals to and from the subscriber's premises. In addition to the video services discussed above, the ONU 232 will provide telephone signals and appropriate power to the subscribers' premises over the twisted wire pairs connected to subscribers' telephone sets 235.

Closed captioning may also be provided in the present invention. The source data for this closed captioning will be the closed captioning data already carried in line 21 of the vertical blanking interval of the source NTSC video signal encoded by the encoder 214. The MPEG encoder 214 will preferably extract that data from line 21 before encoding the video and will process that data as a separate elementary stream. Thus, for a program having closed captioning, the encoder 214 will produce a video elementary stream, an audio elementary stream and a data elementary stream. These three streams will be packetized and combined into a single packet stream for the one program. The video frame packets in the stream will have a first program identifier (PID), the audio packets will have a second PID value, and the data packets have a third PID value. However, the entire stream containing packets with all three PID values for the one program are mapped into cells of a single ATM cirtual circuit (having a single VPI/VCI value). The mapping of packets into ATM cells described above is not dependent in any way on the type of data or the corresponding PID value of each packet. So long as the packets pertain to the same program, the MUX 215 will map 1 or 2 packets into 5 or 8 cells in the manner described above. Apparently, at times the 8 cell adaptation will result in mapping of a video packet and an audio packet together into 8 ATM cells. Similarly, a data packet will occasionally be mapped into ATM cells together with an audio packet or a video packet. In the 8 cell adaptation, the fourth cell will contain 44 bytes from the payload of the first packet (e.g. video) and 4 bytes from the header of the next packet. If the second packet were carrying closed captioning data, the data would be mapped into the payloads of cells 5–8.

As shown above, the present invention provides a full service digital broadband network that provides efficient transmission of DS-3 ATM cell streams. While conventional ATM switches on the order of 80 Gigabyte have been previously used to switch data on networks, the use of an ATM edge device in connection with the disclosed network enables efficient transmission of traffic by performing grooming and mapping to eliminate redundancies and "wasted space" in traffic patterns. One having ordinary skill in the art will realize that different ATM switches may be modified to perform the disclosed functions. Examples of such ATM switches may be found in U.S. Pat. No. 5,323,389, incorporated herein in its entirety by reference.

As shown above, the HDT 230 serves as a switching means to switch DS-3 ATM streams to a plurality of subscriber units in accordance with respective subscriber selection signals. A data path is established between the HDT and the DET via the ONU. One having ordinary skill in the art will realize that different switching systems may be used. For example, the HDT may be replaced by an ADSL arrangement as shown in U.S. Pat. No. 5,247,347 to Litteral et al., incorporated herein by reference. Specifically, customer local loops equipped with Asymmetric Digital Subscriber Line (ADSL) devices are connected to the digital crossconnect switch (DCS). In such an arrangement, the video-on-demand system provides for the simultaneous transport of a one-way 1.544 megabit per second (MBPS) signal over the same twisted pair transmitting voice messages to the residential subscriber. The ADSL transported signal is demultiplexed and the 1.544 portion is then decoded using MPEG standard techniques to deliver a full motion video signal. In the PSTN, fiberoptic technology will replace existing coaxial and twisted pair connectivity with corresponding enhancements made to switching and routing equipment. A more detailed description of implementing ADSL technology to transmit digital broadband signals from a network to a digital entertainment terminal is found in FIG. 11 of commonly-assigned, copending application Ser. No. 08/250,792, filed May 27, 1994. Thus, either the HDT or the ADSL are equivalent in performing as switching means for establishing a path for the video data to the subscriber.

As discussed above, the transmission medium for transmitting the broadband data from the switching means to the subscriber may be varied. For example, the disclosed arrangement may be modified to include a hybrid/fiber coax structure as shown in FIG. 3 of commonly-assigned, copending application Ser. No. 08/304,174, filed Sep. 12, 1994, the disclosure of which is incorporated by reference. Specifically, the HDT is replaced with a loop transport interface that includes an optical transmitter outputting optical signals to a plurality of ONUs, each of which output the broadband data onto a coaxial distribution network for transmission to the DETs.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

We claim:

1. In a digital broadband communication system for transporting broadband data from a plurality of information providers to at least one subscriber, each of said information providers outputting an asynchronous transfer mode (ATM) data stream, said ATM data stream comprising first ATM cells having payload data and second ATM cells lacking payload data, said first and second ATM cells from said each information provider each having a corresponding virtual path/virtual circuit (VPI/VCI) identifier, a network comprising:

an ATM edge device adapted to receive said ATM data streams from said information providers, said ATM edge device comprising an ATM processor assigning said first ATM cells of said corresponding ATM data streams to corresponding ATM output streams, said ATM processor precluding said second ATM cells from being transmitted on said ATM output streams; and switching means for supplying at least one selected group of said first cells corresponding to a selected one of said information providers from one of said ATM output streams to said at least one subscriber, said switching means supplying said selected group of first cells in response to a subscriber request.

2. A network as recited in claim 1, further comprising a video administration module (VAM) adapted to access said switching means, said VAM and said ATM processor receiving a group of authorized VPI/VCI identifiers, said ATM processor assigning said first ATM cells of said corresponding information provider in accordance with said corresponding group of authorized VPI/VCI identifiers.

3. A network as recited in claim 2, wherein said switching means comprises a host digital terminal (HDT) adapted to communicate with said at least one subscriber, said VAM supplying said HDT with a translated VPI/VCI identifier for at least one of said authorized VPI/VCI identifiers, said HDT supplying said translated VPI/VCI identifier to said subscriber to enable said subscriber to capture said selected group of first cells in accordance with said subscriber request.

4. A network as recited in claim 3, wherein each VPI/VCI identifier comprises a virtual circuit identifier (VCI), said ATM processor identifying each of said first and second ATM cells of said ATM data stream on the basis of said respective VCI, said first ATM cells output to said ATM output streams path each having said translated VPI/VCI identifier generated in response to said corresponding VPI/VCI identifier provided by said respective information provider.

5. A network as recited in claim 3, further comprising:

an ATM switch adapted to receive broadband data from second information providers providing interactive broadband services, said ATM switch providing said received broadband data to said switching means; and means for signaling one of said second information providers to transmit said corresponding broadband data in response to a session request sent by said HDT from said subscriber.

6. A network as recited in claim 5, wherein said signaling means comprises:

a level 1 gateway comprising a subscriber database, said level 1 gateway accessing said subscriber database in response to said session request and outputting a list of available second information providers to said subscriber; and a level 2 gateway, communicating with said subscribers in response to a subscriber request for one of said list of available second information providers and outputting an instruction to a server operated by said selected second information provider in response to selection signals from said subscriber, said ATM switch receiving said broadband data from said server in accordance with said instruction by said level 2 gateway to said server.

7. A network as recited in claim 1, wherein said ATM edge device receives said ATM broadband data streams in DS-3 format.

8. A network as recited in claim 7, further comprising a plurality of receivers adapted to receive optical fibers carrying said broadband data from said information providers, said receivers outputting said corresponding ATM data streams in DS-3 format to said ATM edge device.

9. A network as recited in claim 8, wherein said ATM edge device further comprises:

a plurality of DS-3 input ports corresponding to a maximum capacity of DS-3 streams output by said receivers from said corresponding optical fibers, said DS-3 input ports adapted to receive said respective ATM broadband data streams in DS-3 format and output ATM cells, respectively;

a plurality of DS-3 output ports less than or equal to the number of said DS-3 input ports;

a translation table storing translation path values for said ATM cells output by said DS-3 input ports, said translation table storing a translated VPI/VCI identifier and a translated output port, corresponding to one of said DS-3 input ports and said corresponding VPI/VCI identifier provided by said respective information provider; and said ATM processor being coupled to said DS-3 input ports and said DS-3 output ports, said ATM processor translating each of said ATM cells to said corresponding output port and writing said corresponding translated VPI/VCI identifier into said each ATM cell in response to said respective DS-3 input port and VPI/VCI identifier provided by said respective information provider.

10. A network as recited in claim 3, further comprising a plurality of receivers coupled to optical fibers carrying said broadband data from said information providers, said receivers outputting said corresponding ATM data streams in DS-3 format to said ATM edge device.

11. A network as recited in claim 10, wherein said first ATM cells output to said ATM output streams path each have said translated VPI/VCI identifier generated in response to said corresponding VPI/VCI identifier provided by said respective information provider, said ATM edge device further comprising:

a plurality of DS-3 input ports corresponding to a maximum capacity of DS-3 streams output by said receivers from said corresponding optical fibers, said DS-3 input ports adapted to receive said respective ATM data streams in DS-3 format and output ATM cells, respectively;

a plurality of DS-3 output ports less than or equal to the number of said DS-3 input ports;

a translation table storing translation path values for said ATM cells output by said DS-3 input ports, said translation table storing said translated VPI/VCI identifier and a translated output port, corresponding to one of said DS-3 input ports and said corresponding VPI/VCI identifier provided by said respective information provider; and said ATM processor being coupled to said DS-3 input ports and said DS-3 output ports, said ATM processor translating each of said ATM cells to said corresponding output port and writing said corresponding translated VPI/VCI identifier into said each ATM cell in response to said respective DS-3 input port and VPI/VCI identifier provided by said respective information provider.

12. A network as recited in claim 2, wherein said broadband data from said information providers comprise video data, said first ATM cells output to said ATM output streams path each having a translated VPI/VCI identifier generated in response to said corresponding VPI/VCI identifier provided by said respective information provider.

13. A network as recited in claim 1, further comprising a plurality of receivers coupled to optical fibers carrying said broadband data from said information providers, said receivers outputting said corresponding ATM data streams in DS-3 format to said ATM edge device.

14. A network as recited in claim 13, wherein said ATM edge device further comprises:

a plurality of DS-3 input ports corresponding to a maximum capacity of DS-3 streams output by said receivers from said corresponding optical fibers, said DS-3 input ports adapted to receive said respective ATM data streams in DS-3 format and output ATM cells, respectively;

a plurality of DS-3 output ports less than or equal to the number of said DS-3 input ports;

a translation table storing translation path values for said ATM cells output by said DS-3 input ports, said translation table storing said translated VPI/VCI identifier and a translated output port, corresponding to one of said DS-3 input ports and said corresponding VPI/VCI identifier provided by said respective information provider; and said ATM processor being coupled to said DS-3 input ports and said DS-3 output ports, said ATM processor translating each of said ATM cells to said corresponding output port and writing said corresponding translated VPI/VCI identifier into said each ATM cell in response to said respective DS-3 input port and VPI/VCI identifier provided by said respective information provider.

15. In a digital broadband communication system for transporting broadband data from a plurality of information providers to at least one subscriber, each of said information providers outputting an asynchronous transfer mode (ATM) data stream, said ATM data stream comprising first ATM cells having payload data and second unassigned ATM cells lacking payload data, said first and second ATM cells from said each information provider each having a corresponding virtual path/virtual circuit (VPI/VCI) identifier, a method comprising the steps of:

receiving said ATM data streams from said respective information providers;

assigning said first ATM cells of said corresponding ATM data streams to corresponding ATM output streams and rejecting said second unassigned ATM cells from being transmitted on said ATM output streams.;

supplying at least one selected group of said first cells corresponding to a selected one of said information providers from one of said ATM output streams to said at least one subscriber in response to a subscriber request.;

storing a group of authorized VPI/VCI identifiers in a video administration module (VAM); and assigning said first ATM cells of said corresponding information provider in accordance with said corresponding group of authorized VPI/VCI identifiers;

wherein said supplying step comprises the steps of:

storing at least one of said authorized VPI/VCI identifiers in at least one host digital terminal (HDT) adapted to communicate with said at least one subscriber;

supplying said HDT with a translated VPI/VCI identifier for said at least one of said authorized VPI/VCI identifiers;

causing said HDT to supply said translated VPI/VCI identifier to said subscriber to enable said subscriber to capture said selected group of first cells in accordance with said subscriber request.

16. A method as recited in claim 15, wherein said assigning step comprises the steps of:

monitoring data transmission rates of said received ATM data streams, respectively; and rejecting said ATM data streams having unauthorized data transmission rates from being transmitted on said ATM output streams.

17. A method as recited in claim 16, wherein said assigning step further comprises the step of writing to each of said first ATM cells output to said ATM output streams path a translated VPI/VCI identifier in response to said corresponding VPI/VCI identifier provided by said respective information provider.

18. A method as recited in claim 17, wherein said ATM data streams are received in DS-3 format.

19. A method as recited in claim 18, wherein said ATM data streams transport audio/video data in MPEG-2 format.

20. In a digital broadband communication system for transporting broadband data from a plurality of information providers to at least one subscriber, each of said information providers outputting an asynchronous transfer mode (ATM) data stream, said ATM data stream comprising first ATM cells having payload data and second unassigned ATM cells lacking payload data, said first and second ATM cells from said each information provider each having a corresponding virtual path/virtual circuit (VPI/VCI) identifier, a method comprising the steps of:

receiving said ATM data streams from said respective information providers;

assigning said first ATM cells of said corresponding ATM data streams to corresponding ATM output streams and rejecting said second unassigned ATM cells from being transmitted on said ATM output streams;

supplying at least one selected group of said first cells corresponding to a selected one of said information providers from one of said ATM output streams to said at least one subscriber in response to a subscriber request;

establishing a group of authorized VPI/VCI identifiers;

storing a translation table comprising translated VPI/VCI identifiers corresponding to said authorized VPI/VCI identifiers, respectively, said assigning step comprising the step of writing to each of said first ATM cells output to said ATM output streams path one of said translated VPI/VCI identifiers.

21. A method as recited in claim 20, wherein said ATM data streams are received in DS-3 format.

22. A method as recited in claim 21, wherein said ATM data streams transport audio/video data in MPEG-2 format.

23. In a digital broadband communication system for transporting broadband data from a plurality of information providers to at least one subscriber, said information providers outputting respective asynchronous transfer mode (ATM) data streams, each of said ATM data streams comprising ATM cells having a corresponding virtual path/virtual circuit (VPI/VCI) identifier, a network adapted to receive said ATM data streams via a plurality of optical fibers, the network comprising:

a plurality of receivers coupled to said respective optical fibers, each of said receivers adapted to output a predetermined capacity of ATM streams from said corresponding optical fiber;

an ATM edge device coupled to said plurality of receivers and comprising:

a plurality of input ports having respective input port addresses and corresponding to said predetermined capacity of ATM streams for said plurality of optical fibers, at least one of said input ports outputting said ATM cells in response to a supplied ATM stream from said corresponding receiver, a plurality of output ports having respective output port addresses and corresponding to a network capacity less than said predetermined capacity of ATM streams for said plurality of optical fibers, and an ATM processor coupled to said input ports, said ATM processor assigning said ATM cells a translated VPI/VCI identifier and outputting said assigned ATM cells to one of said output ports in response to said corresponding VPI/VCI identifier and said corresponding input port address; and switching means for supplying said assigned ATM cells from said one output port to said subscriber in response to a subscriber request.

24. A network as recited in claim 23, wherein said optical fibers from said information providers supply said ATM data streams in DS-3 format, said ATM streams transporting audio/video data in MPEG format.

25. A network as recited in claim 4, wherein said switching means comprises a host digital terminal (HDT) adapted to communicate with said at least one subscriber, said HDT storing a translated VPI/VCI identifier for said assigned ATM cells and supplying said translated VPI/VCI identifier of said assigned ATM cells to said subscriber to enable said subscriber to capture said assigned ATM cells in accordance with said subscriber request.

26. A network as recited in claim 25, further comprising an administration module storing a group of authorized VPI/VCI identifiers, said ATM processor assigning said assigned ATM cells in accordance with said corresponding group of authorized VPI/VCI identifiers.

27. A network as recited in claim 26, further comprising:

an ATM switch adapted to receive broadband data from second information providers providing interactive broadband services, said ATM switch providing said received broadband data to said switching means; and means for signaling one of said second information providers to transmit said corresponding broadband data in response to a session request sent by said HDT from said subscriber.

28. A network as recited in claim 27, wherein said signaling means comprises:
   a level 1 gateway comprising a subscriber database, said level 1 gateway accessing said subscriber database in response to said session request and outputting a list of available second information providers to said subscriber; and
   a level 2 gateway, communicating with said subscribers in response to a subscriber request for one of said list of available second information providers and outputting an instruction to a server operated by said selected second information provider in response to selection signals from said subscriber, said ATM switch receiving said broadband data from said server in accordance with said instruction by said level 2 gateway to said server.

29. A network as recited in claim 25, further comprising a plurality of optical network units supplying said assigned ATM cells from said switching means to corresponding subscribers, each of said optical network units coupled to coaxial cables disposed at a local loop of said corresponding subscriber.

30. A network as recited in claim 23, wherein said switching means comprises a host digital terminal (HDT) adapted to communicate with said at least one subscriber and storing a translated VPI/VCI identifier for said assigned ATM cells, said HDT supplying said VPI/VCI identifier of said assigned ATM cells to said subscriber to enable said subscriber to capture said assigned ATM cells in accordance with said subscriber request.

31. A network as recited in claim 30, further comprising a plurality of optical network units supplying said assigned ATM cells from said switching means to corresponding subscribers, each of said optical network units coupled to coaxial cables disposed at a local loop of said corresponding subscriber.

32. In a digital broadband communication system for transporting broadband data from a plurality of information providers to at least one subscriber, said information providers outputting respective asynchronous transfer mode (ATM) data streams, each of said ATM data streams comprising ATM cells having a corresponding virtual path/virtual circuit (VPI/VCI) identifier, a network adapted to receive said ATM data streams via a plurality of optical fibers, the network comprising:
   a plurality of receivers coupled to said respective optical fibers, each of said receivers adapted to output a predetermined capacity of ATM data streams from said corresponding optical fiber;
   an ATM edge device coupled to said plurality of receivers and comprising:
   a plurality of input ports corresponding to said predetermined capacity of ATM data streams for said plurality of optical fibers, at least two of said input ports supplying ATM cells in response to active incoming ATM data streams from the corresponding receivers,
   a plurality of output ports corresponding to a network capacity less than said predetermined capacity of ATM data streams for said plurality of optical fibers, and
   an ATM processor coupled to said input ports, said ATM processor assigning said ATM cells supplied via said at least two input ports translated VPI/VCI identifiers and outputting ATM cells having said translated VPI/VCI identifiers to respective at least two output ports corresponding to the translated VPI/VCI identifiers, and
   a transmitter for combining ATM cells from the respective at least two output ports into a single data stream and transmitting the single data stream over another optical fiber; and
   switching means coupled to said another optical fiber for supplying ATM cells having one of the translated VPI/VCI identifiers to said subscriber in response to a subscriber request.

33. A network as recited in claim 32, wherein said switching means comprises a host digital terminal (HDT) adapted to communicate with said subscriber and storing said one translated VPI/VCI identifier, said HDT supplying said one translated VPI/VCI identifier to said subscriber to enable said subscriber to capture said assigned ATM cells in accordance with said subscriber request.

34. A network as recited in claim 33, further comprising a plurality of optical network units supplying said assigned ATM cells from said switching means to corresponding subscribers, each of said optical network units coupled to coaxial cables disposed at a local loop of said corresponding subscriber.

35. A network as recited in claim 34, further comprising an administration module storing a group of authorized VPI/VCI identifiers, said ATM processor assigning said translated VPI/VCI identifiers to said assigned ATM cells in accordance with said corresponding group of authorized VPI/VCI identifiers.

36. A network as recited in claim 35, further comprising:
   an ATM switch adapted to receive broadband data from second information providers providing interactive broadband services, said ATM switch providing said received broadband data to said switching means; and
   means for signaling one of said second information providers to transmit said corresponding broadband data in response to a session request sent by said HDT from said subscriber.

37. A network as recited in claim 36, wherein said signaling means comprises:
   a level 1 gateway comprising a subscriber database, said level 1 gateway accessing said subscriber database in response to said session request and outputting a list of available second information providers to said subscriber; and
   a level 2 gateway, communicating with said subscribers in response to a subscriber request for one of said list of available second information providers and outputting an instruction to a server operated by said selected second information provider in response to selection signals from said subscriber, said ATM switch receiving said broadband data from said server in accordance with said instruction by said level 2 gateway to said server.

38. A network as recited in claim 37, wherein said optical fibers from said information providers supply said ATM data streams in DS-3 format, said ATM streams transporting audio/video data in MPEG format.

39. A network as recited in claim 35, wherein said ATM processor monitors data transmission rates of said supplied ATM data streams, respectively, and rejects said ATM data streams having unauthorized data transmission rates from being transmitted to said at least two output ports.

40. A network as recited in claim 33, further comprising an administration module storing a group of authorized VPI/VCI identifiers, said ATM processor assigning said translated VPI/VCI identifiers to said assigned ATM cells in accordance with said corresponding group of authorized VPI/VCI identifiers.

41. A network as recited in claim 40, further comprising:
an ATM switch adapted to receive broadband data from second information providers providing interactive broadband services, said ATM switch providing said received broadband data to said switching means; and
means for signaling one of said second information providers to transmit said corresponding broadband data in response to a session request sent by said HDT from said subscriber.

42. A network as recited in claim 32, further comprising an administration module storing a group of authorized VPI/VCI identifiers, said ATM processor assigning said translated VPI/VCI identifiers to said assigned ATM cells in accordance with said corresponding group of authorized VPI/VCI identifiers.

43. A network as recited in claim 42, further comprising:
an ATM switch adapted to receive broadband data from second information providers providing interactive broadband services, said ATM switch providing said received broadband data to said switching means; and
means for signaling one of said second information providers to transmit said corresponding broadband data in response to a session request sent by said HDT from said subscriber.

44. In a digital broadband communication system for transporting broadband data from a plurality of information providers to at least one subscriber, said information providers outputting respective asynchronous transfer mode (ATM) data streams, each of said ATM data streams comprising ATM cells having a corresponding virtual path/ virtual circuit (VPI/VCI) identifier, a method for transporting said ATM cells through a network adapted to receive said ATM data streams via a plurality of optical fibers, the method comprising the steps of:
coupling said optical fibers to a corresponding plurality of receivers each being adapted to output a predetermined capacity of ATM data streams from said corresponding optical fiber;
supplying outputs from said plurality of receivers to an ATM edge device comprising a plurality of input ports corresponding to said predetermined capacity of ATM data streams for said plurality of optical fibers and a plurality of output ports corresponding to a network capacity less than said predetermined capacity of ATM data streams for said plurality of optical fibers;
receiving from at least two of said input ports ATM cells in response to active incoming ATM data streams from the corresponding receivers;
assigning translated VPI/VCI identifiers to said ATM cells supplied via said at least two input ports;
outputting said assigned ATM cells to respective at least two of said output ports corresponding to the translated VPI/VCI identifiers;
combining said assigned ATM cells from the respective at least two output ports into a single data stream and transmitting the single data stream over another optical fiber; and
supplying ATM cells having one of the translated VPI/VCI identifiers to said subscriber in response to a subscriber request.

45. A method as recited in claim 44, further comprising the steps of:
establishing a group of authorized VPI/VCI identifiers;
storing said group of authorized VPI/VCI identifiers in a video administration module (VAM);
correlating said translated VPI/VCI identifiers with said group of authorized VPI/VCI identifiers, said assigning step being performed in accordance with said group of authorized VPI/VCI identifiers.

46. A method as recited in claim 45, wherein said supplying step comprises the steps of:
storing at least one of said authorized VPI/VCI identifiers in at least one host digital terminal (HDT) adapted to communicate with said at least one subscriber;
supplying said HDT with one of said translated VPI/VCI identifiers corresponding to said at least one of said authorized VPI/VCI identifiers;
causing said HDT to supply said one translated VPI/VCI identifier to said subscriber to enable said subscriber to capture said selected group of first cells in accordance with said subscriber request.

47. A method as recited in claim 46, wherein said assigning step comprises the steps of:
monitoring data transmission rates of said active ATM data streams, respectively; and
rejecting said active ATM data streams having unauthorized data transmission rates from being transmitted on said ATM output streams.

48. A method as recited in claim 44, further comprising the steps of:
establishing a group of authorized VPI/VCI identifiers;
storing a translation table comprising said translated VPI/VCI identifiers corresponding to said authorized VPI/VCI identifiers, respectively.

49. A method as recited in claim 48, wherein said ATM data streams are received by said receivers in DS-3 format.

50. A method as recited in claim 49, wherein said ATM data streams from said information providers transport audio/video data in MPEG-2 format.

* * * * *